July 30, 1968   E. R. KENNEDY   3,395,058
ENCAPSULATION METHOD
Filed Dec. 1, 1964

INVENTOR.
EVERETT R. KENNEDY
BY
Weingarten, Orenbuch & Lahive
ATTORNEYS

United States Patent Office 3,395,058
Patented July 30, 1968

3,395,058
ENCAPSULATION METHOD
Everett R. Kennedy, Sudbury, Mass., assignor to Atkins & Merrill, Inc., Sudbury, Mass., a corporation of Massachusetts
Filed Dec. 1, 1964, Ser. No. 415,011
6 Claims. (Cl. 156—67)

ABSTRACT OF THE DISCLOSURE

A method is described for encapsulating a lamp of the type having electroluminescent material between a pair of electrodes of which at least one of the electrodes transmits the light given off by the electroluminescent material. A fibrous light transmitting cloth, impregnated with an unpolymerized thermosetting organic resin, is placed over the light transmitting electrode and an impervious membrane is placed over the cloth. Pressure is applied upon the surface of the membrane and the membrane is maintained in place until the resin has polymerized.

---

This invention relates to electroluminescent devices and concerns the treatment of those devices to protect them against the deleterious effects of their environment.

Electroluminescent lamps presently being produced in "commercial" quantities are characterized by a marked decrease in light output during the cumulative time that the lamp is operated. When used outdoors, electroluminescent lamps, unless protected within a weatherproof housing, have a life expectancy that is considerably less than the life expectancy when the lamps are used indoors in dry surroundings. It is known that when electroluminescent lamps are used indoors in a humid environment, the life of the lamp may fall below the life expectancy for outdoor use. It has been concluded, therefore, that the reduction in lamp life encountered in outdoor use or in humid environments is due to damage caused by moisture in the atmosphere. In efforts to prolong the life of electroluminescent devices, those devices usually are enclosed within a covering of material that is normally impervious to moisture. Glass, ceramics and synthetic resins have been employed as the covering. For example, electroluminescent lamps of the flexible type usually are encased in a sheath of Teflon and electroluminsecent lamps of the rigid type usually have a glass or ceramic coating. Epoxy resins and other plastic materials have been employed to coat electroluminescent lamps. However, it has been found that only thick resinous coats are effective. The thickness required in the resinous coating coupled with the bulk cost of suitable resins has precluded employing resinous coatings in producing "commercial" quantities of electroluminescent lamps.

The present invention pertains to a process for coating electroluminescent devices which protect them from moisture and other deleterious substances in their environment. In the process, a fibrous material, such as glass cloth impregnated with an organic thermosetting resin, is laid over the electroluminescent lamp with a thin membrane, such as cellophane covering the impregnated material. In glass cloth, as is well known, extremely fine fibers or filaments of glass are combined into yarn which is woven to form a cloth. The term "fibrous material" here means a material made of yarns or equivalent bundles of such fibers. Pressure is applied upon the membrane to force the resin into the interstices of the fibrous material and to work bubbles and excess resin toward the edges of the membrane. The thermosetting resin is then allowed to "set," the membrane is removed, and the excess material is trimmed off.

Figure 1:
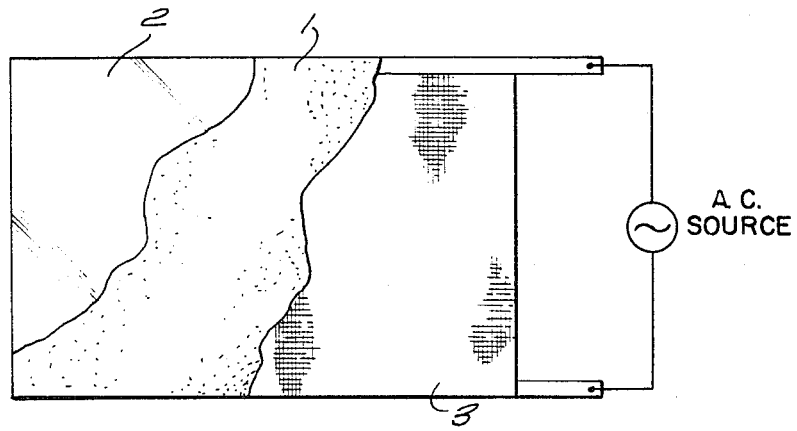
Figure 2:
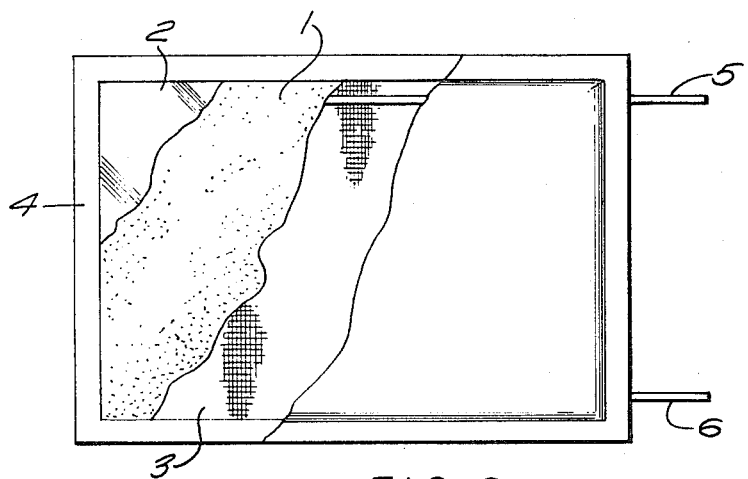
Figure 3:
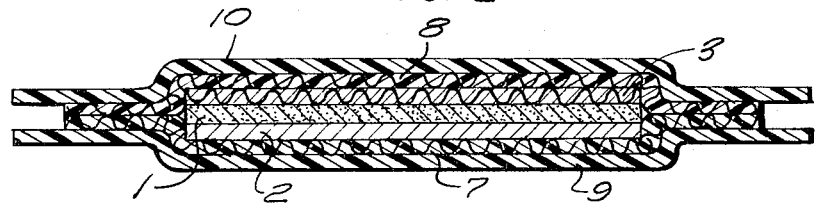

The invention, both as to the manner in which it may be practiced and the materials used in its performance, can be better understood from the following exposition and the accompanying drawing in which:

FIG. 1 depicts a basic electroluminescent lamp;
FIG. 2 illustrates an electroluminescent lamp having a conventional sheath;
FIG. 3 shows an assemblage formed in the practice of the invention.

An electroluminescent lamp essentially consists of an electroluminescent material disposed between a pair of electrodes across which an alternating electric field can be established. At least one of the electrodes must be able to transmit the light emitted by the electroluminescent layer. In FIG. 1, the electroluminescent material is a thin layer 1 spread upon a foil of aluminum 2. Commonly, the electroluminescent material is a phosphor compound and is in the form of a powder dispersed in a binder of a dielectric material that adheres to the aluminum foil. A transparent or translucent electrode 3 is placed over the electroluminescent layer and the alternating electric field is established between the aluminum foil, which constitutes an electrode, and the light transmitting electrode 3. The light transmitting electrode, may, for example, be a textile or felt of glass fibers that has been coated with a thin film of material such as tin oxide to render the cloth conductive. A sheet of nylon, treated to render it electrically conductive, may, alternatively, be employed as the light transmitting electrode. As the aluminum foil and the glass cloth are very flexible, bending of the lamp is limited by the frangibility of the electroluminescent layer. In a rigid electroluminescent lamp, one or both of the electrodes may be a rigid member. For example, the opaque electrode in a rigid lamp may be a sheet of steel and the light transmitting electrode may be a sheet of glass.

To protect the electroluminescent material from damage by moisture and other deleterious substances in its environs, the flexible electroluminescent lamp, as indicated in FIG. 2, is commonly enclosed in a sheath of a plastic material 4 such as Teflon (polytetrafluoroethylene). Electrical leads 5 and 6, which are usually ribbons of copper, are brought out through the sheath to provide the means for applying an alternating electric potential to the electrodes of the lamp. The sheath is formed of two imperforate sheets that are joined along their borders. It has been found that the plastic sheath is not fully effective as leaks tend to develop along the leads. Further, because the sheath merely envelops the lamp and is not otherwise adherent to it, any penetration through the sheath or along the leads permits deleterious substances to spread throughout the entire length and breadth of the lamp.

The useful life of an electroluminescent lamp is materially prolonged by encapsulating the lamp in an adherent coating having one or more layers of a thin fibrous dielectric material embedded in a thermosetting resin. The coating is applied to the basic electroluminescent lamp in a manner causing the resin to be forced through the interstices of the fibrous material into contact with the electrodes of the lamp. Preferably the fibrous dielectric material is a thin glass textile or felt cloth having good light transmitting properties. The glass cloth, initially is wet with a catalytic thermosetting resin and placed upon an impermeable membrane, such as cellophane, to which the resin does not adhere. Electrical leads are attached to the electrodes of the electroluminescent lamp and the lamp, with its attached leads, is laid upon the resin wetted fiberglass cloth. Over the lamp is laid another sheet of glass cloth which has been impregnated with the thermosetting resin and a membrane of cellophane is placed over the resin wetted glass cloth. The glass cloth laminates overlap the area of the electroluminescent lamp so that the borders of the cloth laminates meet. The excess resin and entrapped air are worked toward the edges of the cellophane covered assemblage while sufficient pressure is applied upon the membrane to assure that the resin is forced into the interstices of the cloth. If desired, the bed upon which the assemblage is supported may be heated to hasten the polymerization of the resin. After the resin has set, the cellophane membranes are removed and the excess material is trimmed away. FIG. 3 is a sectional view of the assemblage in which the thickness of the layers are exaggerated. The basic electroluminescent lamp is constituted by the electroluminescent phosphor layer 1 and the electrodes 2 and 3. Electrode 2 is assumed to be an imperforate foil of aluminum. Electrode 3 may be an imperforate sheet of a light transmitting material, such as nylon (hexamethylene diamine-adipic acid concentrate) or of Mylar (diethyl terephthalate-ethylene glycol condensate), which has been rendered electrically conductive. Preferably, electrode 3 is an electrically conductive glass textile or felt cloth which permits it to be impregnated with the resin that is forced through the interstices in glass cloth laminates 7 and 8. Cellophane membranes 9 and 10 cover laminates 7 and 8 and the membranes are open at the edges to permit entrapped air and excess resin to be forced out. Preferably, the glass cloth employed for laminates 7 and 8 is a thin woven material having a moderately dense weave. The thickness of the laminate is determined almost entirely by the thickness of the glass cloth. The tightness of the weave governs, to a large extent, the amount of resin needed to form an imperforate laminate since all the interstices in the cloth must be filled with resin. After working the entrapped air and excess resin to the edges of the assemblage, the cellophane membranes are retained in place until the resin has "set" at least to a consistency where it is tacky and highly viscous. If desired, the membranes may be retained in place until the resin has become a solid. To hasten the setting of the resin, heat may be applied to the assemblage.

The resin employed in the encapsulation of the electroluminescent lamp must be impermeable to moisture, should be adherent to the electrodes of the lamp, and must form an imperforate layer with the cloth which it impregnates. Polyester and epoxy resins have been found to be suitable as encapsulation materials. For example, a polyester resin sold under the name of Hetrone No. 92 by the Durez Division of the Hooker Chemical Company has been employed. To promote the polymerization of the polyester resin, ¼ of 1% to 1¼% by weight of cobalt naphthanate, and ½ of 1% to 2% by weight of methyl ethyl ketone peroxide have been used. Other polymerization agents are known for polyester resins and may, of course, be employed. Where an epoxy resin is used, it is, preferably, polymerized by employing 10 to 12 parts by weight of diethylene triamine. Other polymerization agents for epoxy resins may be employed and a discussion of such agents is set forth in "Epoxy Resins" by Lee and Neville, published by McGraw-Hill. Further, the flexibility of epoxy resins can be improved by adding 20 to 45% by weight of a polyamide.

In the preferred embodiment of the invention, the light transmitting electrode 3 is a transparent cloth woven of glass fibers, the density of the weave permitting the resin to be forced through the spaces in the cloth into contact with the electroluminescent phosphor layer. The resin, preferably, is of a type which adheres to the electroluminescent layer. The bonding of the resin directly to the electroluminescent layer results in a structure that localizes the effect of any moisture that penetrates the lamp.

While the steps in performing the encapsulation process have been described as employing specific materials, it is evident that other materials may be substituted without altering the essential nature of the invention. Further, it is manifest that the thickness of the encapsulating coatings can be increased by laying one laminate upon another. In view of the obvious changes that can be made in carrying out the process, it is intended that the scope of the invention be construed in accordance with the appended claims.

What is claimed is:

1. The method of encapsulating a lamp of the type having an electroluminescent layer disposed between a pair of electrodes, at least one of the electrodes being foraminous and transmitting the light emitted by the electroluminescent material, which method comprises:
    (a) impregnating a light transmitting fibrous cloth with an unpolymerized thermosetting organic resin which is adherent to the electroluminescent layer,
    (b) placing an impervious membrane over the resin impregnated cloth,
    (c) applying pressure to the membrane to force the resin through the foraminous electrode and into contact with the electroluminescent layer,
    (d) maintaining the pressure on the membrane (in place) until the resin is substantially polymerized,
    (e) relieving the pressure upon the membrane, and
    (f) separating the encapsulated lamp from the membrane.

2. The method of encapsulating a lamp of the type having an electroluminescent layer disposed between a pair of electrodes, at least one of the electrodes transmitting the light emitted by the electroluminescent material, which method comprises:
    (a) placing a light transmitting fibrous glass cloth impregnated with an unpolymerized thermosetting resin over the light transmitting electrode,
    (b) placing a cloth impregnated with the unpolymerized thermosetting resin over the other electrode,
    (c) covering the resin impregnated cloths with an impervious membrane,
    (d) applying pressure to the membrane to cause the resin to be brought into contact with the electrodes, the resin being of a type adherent to the electrodes,
    (e) maintaining pressure upon the membrane (in place) until the resin is substantially polymerized,
    (f) relieving the pressure upon the membrane, and
    (g) separating the encapsulated lamp from the membrane.

3. The method of encapsulating a lamp of the type having an electroluminescent material disposed between a pair of electrodes and in which at least one of the electrodes transmits the light emitted by the electroluminescent material, which method comprises:
    (a) placing the lamp between fibrous cloths impregnated with an unpolymerized thermosetting organic resin, the resin impregnated cloths extending beyond the edges of the lamp so that the entire lamp is situated between the cloths, the impregnated cloth adjacent to the light transmitting electrode permitting light to pass through it,
    (b) placing the lamp and impregnated cloth assemblage between a pair of resin impervious members,
    (c) causing the impervious members to apply pressure to force the resin into the interstices of the cloth,
    (d) maintaining the pressure until the resin is substantially polymerized,
    (e) relieving the pressure imposed by the impervious members, and
    (f) separating the encapsulated lamp from the impervious members.

4. The method according to claim 3, further including the step of
applying heat to the assemblage, while pressure is maintained upon it by the impervious members, to promote the polymerization of the resin.

5. The method according to claim 3 wherein
the unpolymerized thermosetting organic resin is selected from the groups of polyester and epoxy resins.

6. The method according to claim 5 wherein
the fibrous cloths are woven of glass yarn.

References Cited

UNITED STATES PATENTS 2,965,532  12/1960  Taylor _____ 161—195
3,253,173  5/1966  Levetan _____ 156—67

DOUGLAS J. DRUMMOND, *Primary Examiner.*